United States Patent Office 3,176,001
Patented Mar. 30, 1965

3,176,001
CONCENTRATION OF GELATIN SOLUTIONS BY COACERVATION USING GELATINS OF OPPOSITE ISOIONIC pH
Arthur Veis, Skokie, and Jerome Cohen and Catherine J. Aranyi, Chicago, Ill., assignors, by mesne assignments, to Armour and Company, Chicago, Ill., a corporation of Delaware
No Drawing. Filed Nov. 4, 1960, Ser. No. 67,167
6 Claims. (Cl. 260—118)

This invention relates to gelatin and glue preparations, and to a complex coacervation method for concentrating, fractionating and modifying them.

Gelatin is the hot water soluble, gel forming protein derived from collagen. It is the major component of animal glue. Generally gelatin is manufactured by heating collagen bearing material in an acid or alkaline solution to extract so-called acid precursor or alkali precursor gelatin. In commercial practice the collagenous stock is extracted at successively higher temperatures in several steps, usually about six. The liquors, or solutions, which are obtained at each step vary in concentration from about 1% gelatin by weight in the first and last extractions to about 4% in the intermediate extractions. These gelatin liquors are individually concentrated by evaporation of water and blended according to quality requirements. The blended and concentrated solutions are then dried.

Water evaporation facilities which are ordinarily essential to gelatin manufacture are relatively expensive to install and operate. Due to the expense of such installations, it is common practice to have large centrally located glue and gelatin manufacturing plants. Because of the bulk and perishability of collagenous stock there are distinct disadvantages to transporting such stock to a central location. Material which could originally be used for the production of edible gelatin often must be used for glue manufacture because it is no longer suitable for edible purposes after reaching a central destination. Proteinaceous impurities normally contained in some fractions of gelatin are often undesirable to gelatin blends, for certain specialized uses purified gelatin fractions being most useful. It is further desirable to have available fractions of pure gelatin which have not been exposed to the degradation which results from excessive heating, solvent fractionation, precipitation, and the like.

A general object of this invention is to provide a method for concentrating gelatin and glue solutions which does not involve the evaporation of water. Another object is to provide a simple method of fractionating gelatins which obviates difficulties resulting from the addition of solvents and reagents to gelatin solutions. A further object is to provide concentrated and undenatured solutions of gelatin which are susceptible to being readily flocculated and extruded as filaments and sheets under conditions where usual gelatins are completely soluble. Yet another object is to provide a method for separating gelatin from impurities such as other proteins. Other objects and advantages will become apparent to those skilled in the art as the specification proceeds.

In accordance with certain aspects of our invention liquid gelatin solutions having opposite isoionic points are blended to produce a mixture which is susceptible to separation into two phases, a gelatin-rich coacervate phase and a dilute gelatin phase. By temperature control coacervated gelatin fractions appear in the reaction system, these fractions being readily separable by centrifugation or other comparable methods of mechanical separation. Heretofore, there has been no known method of inducing complex coacervation in gelatin-gelatin systems.

The character of the electrical charge of each gelatin to be blended is of major importance. Coacervation results from electrical interaction of oppositely charged macro or colloidal ampholytes. Accordingly, in practicing the complex coacervation phase of this invention, gelatins having dissimilar isoionic points are supplied to the reaction system. Gelatin as a typical protein having the ability to act as an acid or a base is an ampholyte and exists in solution as a macro dipolar ion or zwitterion. In an acid medium macro cations are formed and in an alkaline medium macro anions are formed. At the isoionic point the concentration of zwitterions in a gelatin solution is maximum and the concentration of ampholytic macro anions and cations are equal and minimum. Acid precursor gelatins generally have an isoionic pH of between about 7.0 and 9.0, whereas alkali-precursor gelatins have an isoionic pH between about 4.7 and 5.2. In addition to the pH of the extraction medium, the sources of collagenous raw material will affect the isoionic pH of the gelatin derived from it.

Gelatin employed in the practice of this invention may be derived from any of the usual collagen sources: hide pieces, pork skins, ossein, tendons, etc. Although any of the usual extraction methods may be used to prepare the gelatins, at least two different types of gelatin should be simultaneously available for addition to the gelatin reaction system. It is preferable that the isoionic points of the gelatins be as widely separated as possible because as the isoionic pHs become more widely spread the tendency for electrical interaction or coacervation becomes greater. We prefer to simultaneously prepare acid precursor gelatins and alkali precursor gelatins for blending. From commonly used materials and using common commercial processing procedures, gelatins having isoionic pHs of 4.9 and 8.9 for alkali and acid extraction processes respectively can be readily produced.

To promote satisfactory coacervation it is normally required that the gelatin solutions to be interacted are isoionic or of very low ionic strength. Significant levels of electrolytes in the solutions interfere with coacervate formation. The presence of appreciable concentrations of micro ions discourage electrical interaction.

Unmodified gelatin solutions should be handled in a manner such that they are substantially salt-free at time of interaction. Substantially salt-free is defined as meaning a condition in which a solution is substantially free of micro cations and micro anions as distinguished from macro or colloidal ions. One simple method, and the method we prefer to use, of preparing low ionic strength solutions is mixed bed resin ion exchange. Typically, an anion exchange resin such as Amberlite IRA-400 and a cation exchange resin such as Amberlite IR-120 are mixed, water washed and packed in columns. The liquid gelatin solutions are circulated through the columns prior to blending. Other suitable means such as dialysis may be used for removing salts from the solution. A double bed, separate anion and cation exchangers, method may be used although we prefer the single mixed bed method in which the gelatins are not subjected to extreme changes in pH during deionization.

Salt tolerance of the process may be increased by chemically modifying the gelatins to shift their isoionic pHs further apart. An acid precursor gelatin normally having an isoionic point of around pH 9.0 can be modified by known procedures to shift its isoionic pH to 12, for example. An alkali extracted gelatin can be similarly modified to shift its charge distribution from the normal isoionic pH of around 5.0 to one of around 2.0. By shifting the charge distributions of the oppositely charged gelatin polyions, their tendency to electrically interact is enhanced. Enhancement of the tendency to interact, or coacervate, results in an increase in salt tolerance within the system.

Suitable modification methods include methylation as with methyl alcohol and hydrochloric acid to make the gelatin more basic, acetylation by use of aceticanhydride or acetylchloride to shift the gelatin to a more acid level, esterification or formaldehyde modification. These and other well-known modification procedures may be used to build desired properties into the gelatins in addition to increasing the salt tolerance of the reaction system.

A preferred aspect of this invention involves the reaction of at least one gelatin in water solution having an isoionic pH above 7.0 and at least one gelatin in water solution having an isoionic pH below 7.0. The separate solutions may be adjusted to a concentration of within the range of about 0.05% to 5% gelatin by weight in water. The solutions are separately deionized if necessary. The resulting low ionic strength solutions may then be adjusted and maintained at a temperature which is preferably above the gelation points of the gelatin in each solution, gelation or setting points of gelatins generally being below about 35° to 40° C. The oppositely charged liquid gelatins are then blended and held at a temperature of from about 0° C. to 50° C. for a short time interval. During this time interval a coacervate forms, causing the blended solutions to become turbid. The gelatin-rich coacervate fraction may then be mechanically separated from the dilute or substantially gelatin-free fraction as by centrifugation. If fractionation is desired, progressive reduction of temperatures of the solution followed by separation is repeated until the blended solutions are at the lower end of the temperature range.

The initial step of the process embodiment of this invention involves blending of oppositely charged low ionic strength gelatin solutions which are in the liquid or ungelled state. Temperatures in excess of about 60° C. cause occurrence of rapid hydrolysis of gelatins especially in the presence of mineral acids or alkalies. Therefore, each solution prior to blending is preferably adjusted to a temperature within the range of about 40° C. to 60° C. Coacervation generally will not occur in unmodified gelatins at temperatures in excess of about 50° C. although if rapid cooling procedures are employed, the solutions may be blended at somewhat higher temperatures, 80° C. for example. Solutions which have been blended at temperatures above about 80° C. generally will not furnish satisfactory yields of coacervates. Once the gelatins are blended at temperatures above their gelation points, coacervate fractions may be removed at any temperature within the range of about 0° to 50° C.

One of the primary advantages to this process is that it makes possible the recovery of concentrated gelatins from very dilute solutions. Thus, solutions which ordinarily could not be economically concentrated by water evaporation may be concentrated using the process of this invention. We prefer to have a solution concentration of about 0.1% to 3% gelatin by weight in water, although solution concentrations of from about 0.05% to 5% may be satisfactorily blended and concentrated. Approximately equal parts of each type of gelatin solution should be blended for most complete collection. The coacervate, which is electrically neutral, is formed by the interaction of equal amounts of each type of gelatin. Although widely varying proportions of oppositely charged gelatins may be added to the reaction system with the resulting formation of a gelatin coacervate, the reaction will stop before separation of all the gelatin in the system if unequal amounts of differently charged gelatins are initially blended.

After blending of the solutions, optimally about compositely equal parts of each electrical type of gelatin at about 40° C., an ageing or equilibrating period is preferably employed to allow the gelatin emulsoid particles to form liquid droplets. The formation of droplets causes the mixed solutions to become turbid.

At this stage of the process two alternative procedures may be followed depending upon whether or not fractionation is desired. If simple concentration without fractionation is desired, the mixed solutions are cooled before separating the coacervate fraction. If fractionation in addition to concentration is desired, the fractions are collected serially after a stepwise reduction of temperature. In other words, if concentration alone is required the blend may be cooled to a temperature appreciably below 40° C., for example as low as 5° C. The cooled solution, probably largely gelled at that low temperature, is mechanically separated to remove essentially all the gelatin from the water. Alternatively, if gelatin fractions are desired the blend may be maintained for a few minutes at 40° C. and then separated as by centrifugation to remove a gelatin fraction, further cooled to about 5° C. to 15° C. and reseparated to collect the remaining gelatin from the water. We have discovered that definite fractions may be obtained in good yields by consecutively reducing the temperature at intervals of about 10° C. to 20° C. between each collection. To illustrate three fractions of concentrated gelatin may be collected by the following procedure; blend the solutions at a temperature of about 40° C. to about 50° C., hold at those temperatures for about 15 to 30 minutes and separate the gelatin droplets formed; reduce the temperature of the supernatant to about 20° C. to 30° C. and collect a second concentrated gelatin fraction; cool the remaining solution to about 5° C. to 15° C., hold for a period of time and separate out the remainder of the gelatin.

A time interval which generally lengthens as the temperature is lowered is preferably allowed after the solution has reached the lower collection temperature plateau. During this time interval the liquid gelatin droplets coalesce, thereby increasing the efficiency of separation. At reaction temperatures of around 40° C. equilibration time should be more than about 15 minutes and preferably about 30 minutes for a maximum yield of the gelatin fraction coacervating at that temperature. At temperatures of about 5° C. to 15° C. the gelatin is preferably allowed to equilibrate for about 2 to 3 hours to ensure that substantially all gelatin may be removed from the water upon separation. Shorter times are operable although yields may be somewhat lower.

Following equilibration at the selected temperature, ranging from about 5° C. to 60° C. as stated above, the coacervate is separated from the blended solutions. Preferably centrifugation or comparable mechanical separation is employed for efficient collection of the coacervate. If centrifugation is used, a speed sufficient to create forces of at least about 5,000 to 10,000 $g$ ($g$ representing the force of gravity) is desirable. Somewhat lower speeds may be used but generally a lesser amount of the coacervate phase will be collected.

The following specific examples will serve to illustrate our invention.

*Example 1*

Two solutions of gelatins having isoionic points of pH 4.9 and pH 8.9 were prepared at equal concentrations. The solutions were held at 40° C. until temperature equilibration and equal quantities of each solution were blended. After keeping the mixture at 40° C. for about 30 minutes, a coacervate which had formed was separated by centrifugation. The dilute supernatant was separated, cooled to 25° C. and maintained at that temperature for 30 minutes. A new coacervate which had formed was removed by centrifugation. The resulting supernatant was further cooled and held at 15° C. for 30 minutes, during which time most of the remaining gelatin piled up in the concentrated phase.

Yields can be increased about 15 to 20% if during the lower temperature steps the flocculated aggregates are removed from the supernatant together with the coacervate phase.

The following table contains the results of the above concentration and fractionation procedure.

|   | Temp. of Separation, °C. | Total Conc. of mixture at beginning of each step, g. ml.⁻¹ | Total amt. gelatin in coacervate at each step, g. | Gelatin Conc. in Coacervate, g. ml.⁻¹ | Total Vol. of mixture at beginning of each step, ml. | Vol. of Coacervate, ml. | Total gelatin in mixture at beginning of each step, g. |
|---|---|---|---|---|---|---|---|
| 1 | 40 | 0.0050 | 0.056 | 0.049 | 100.00 | 1.14 | 0.500 |
| 2 | 25 | 0.0045 | 0.145 | 0.050 | 98.86 | 2.90 | 0.444 |
| 3 | 15 | 0.0031 | 0.091 | 0.055 | 95.96 | 1.65 | 0.299 |

It may be concluded from this table that 58.4%, 68.3% and 74.6% of the total gelatin in the mixture can be recovered in 5.7%, 10.2% and 16.2% of the mixture's original volume.

*Example II*

Using the same procedure as Example I but with the original solutions of gelatin having a higher concentration, the following results were obtained:

|   | Temp. of Separation, °C. | Total Conc. of mixture at beginning of each step, g. ml.⁻¹ | Total amt. gelatin in coacervate at each step, g. | Gelatin Conc. in Coacervate, g. ml.⁻¹ | Total Vol. of mixture at beginning of each step, ml. | Vol. of Coacervate, ml. | Total gelatin in mixture at beginning of each step, g. |
|---|---|---|---|---|---|---|---|
| 1 | 40 | 0.0090 | 0.020 | 0.040 | 100.00 | 0.50 | 0.900 |
| 2 | 25 | 0.0088 | 0.388 | 0.044 | 99.50 | 8.82 | 0.880 |
| 3 | 15 | 0.0054 | 0.263 | 0.038 | 90.68 | 6.92 | 0.492 |

*Example III*

Using the same general procedure employed in Example I but collecting the coacervates in two steps resulted in the following:

|   | Temp. of Separation, °C. | Total Conc. of mixture at beginning of each step, g. ml.⁻¹ | Total amt. gelatin in coacervate at each step, g. | Gelatin Conc. in Coacervate, g. ml.⁻¹ | Total Vol. of mixture at beginning of each step, ml. | Vol. of Coacervate, ml. | Total gelatin in mixture at beginning of each step, g. |
|---|---|---|---|---|---|---|---|
| 1 | 25 | 0.0090 | 0.400 | 0.043 | 100.00 | 9.30 | 0.900 |
| 2 | 15 | 0.0055 | 0.272 | 0.0375 | 90.70 | 7.25 | 0.500 |

It may be observed that 74.7% of the gelatin in the mixture was concentrated in 16.5% of the volume using two separation steps.

*Example IV*

A one step coacervation collection process, similar to Example I but omitting the first two collection steps, resulted in the concentration of 77.0% of the gelatin in 19.3% of the mixture as follows:

|   | Temp. of Separation, °C. | Total Conc. of mixture, g. ml.⁻¹ | Total amt. gelatin in Coacervate, g. | Gelatin Conc. in Coacervate, g. ml.⁻¹ | Total Vol. of mixture, ml. | Vol. of Coacervate, ml. | Total Gelatin in mixture, g. |
|---|---|---|---|---|---|---|---|
| 1 | 15 | 0.0100 | 0.770 | 0.040 | 100.00 | 19.25 | 1.000 |

*Example V*

The following procedure may be used to modify gelatin by the esterification of protein carboxyl groups. The derivative produced by this modification will display a pH which is higher than usual acid precursor gelatin. When reacted with a gelatin solution having an opposite pH, it will react more readily because of the more widely separated charges of the two solutions. The salt tolerance of the reaction system is also increased by this procedure.

About one gram of gelatin is suspended in about 0.002 to 0.04 N solution of concentrated $H_2SO_4$ in commercial absolute methanol. The solution is allowed to react for about 20 hours at room temperature. After decantation and washing with methanol, the residue is dissolved in about 10 volumes of water and the pH adjusted from 2 to 6 with sodium hydroxide solution. The derivative may be freed of salts by dialysis against distilled water.

Deionization may be effected by passing the derivative through a mixed bed ion exchanger at 40° C. Amount of esterification is dependent upon the concentration of acid in the methanol used for the esterification and the time of treatment with the reagent.

A maximum methoxyl content of 1.37 mmoles/g. can be obtained (corresponding to a carboxyl content of 1.26 mmoles/g. in the original gelatin). Washing with water at 4° C. for 24 hours reduces the methoxyl content up to 20%. The ionization also reduces the methoxyl content to about 0.4 mmoles/g. or less.

*Example VI*

The following gelatin modification procedure may be employed to reduce the pH of gelatin solutions by acetylation of gelatin amino groups.

About 50 gms. of anhydrous powdered gelatin may be allowed to swell in about one liter of water for one hour at 10–15° C. After swelling it is dissolved by warming to 40° C. 25 to 150 gms. of anhydrous sodium acetate is then dissolved in the warm solution which is cooled. 0.5 to 400 gms. of acetic anhydride is added to the vigorously stirred solution at a rate slow enough to maintain a temperature of less than 35° C. On completion of the addition, stirring is continued for 10 to 15 minutes and the mixture is allowed to gel at about 4° C. for two hours. The gel is cut up into small pieces and washed with tap water at about 10° C. for 48 hours, followed by a 24 hour distilled water wash. The derivative may be de-ionized with a mixed bed ion exchanger at 40° C. The amount of acetylation is dependent mainly on the amount of acetic anhydride used.

While in the foregoing detailed description various embodiments of the invention have been given in considerable detail for clearness of understanding, no unnecessary limitation should be understood therefrom as it will be apparent to those skilled in the art that our invention is susceptible to many variations without departing from the spirit and basic concept of the invention.

We claim:

1. A process for obtaining a concentrated gelatin phase from aqueous solutions of gelatin, comprising mixing a first aqueous solution of a gelatin with a second aqueous solution of a different gelatin, said mixing being carried out at a temperature within the range from about 40 to 60° C., the gelatin in one of said solutions being an acid-precursor gelatin having an alkaline isoionic pH and the gelatin in the other of said solutions being alkali-precursor gelatin having an acidic isoionic pH, both of said gelatin solutions being substantially salt-free, reducing the temperature of the mixture thus obtained by at least 10° C. to form a concentrated coacervate phase containing a complex coacervate of said first and second gelatins and a dilute supernatant solution of said gelatins, and separating the said concentrated coacervate phase from the supernatant solution.

2. The process of claim 1 in which said acid-precursor gelatin has an isoionic pH within the range from about 8.8 to 9.1.

3. The process of claim 1 in which said alkali-precursor gelatin has an isoionic pH within the range from about 4.7 to 5.2.

4. A process for obtaining a concentrated gelatin phase from aqueous solutions of gelatin, comprising mixing a first aqueous solution of a gelatin with a second aqueous solution of a different gelatin, said gelatin solutions containing from .05 to 5% gelatin by weight, said mixing being carried out at a temperature ranging from about 40 to 60° C., the gelatin in one of said solutions being an acid-precursor gelatin having a pH of from about 8.8 to 9.1 and the gelatin in the other of said solutions being alkali-precursor gelatin having a pH ranging from about 4.7 to 5.2, both of said gelatin solutions being substantially salt-free, reducing the temperature of the mixture thus obtained to form a concentrated coacervate phase containing a complex coacervate of said first and second gelatins and a dilute supernatant solution of said gelatins, and separating the said concentrated coacervate phase from the supernatant solution.

5. The process of claim 4 in which said gelatin solutions have a gelatin concentration of from about .01 to 3% by weight, and in which the two gelatins are mixed in approximately equal parts by weight.

6. A process for obtaining a series gelatin fractions from aqueous solutions of gelatin, comprising mixing a first aqueous solution of a gelatin with a second aqueous solution of a different gelatin, said mixing being carried out at a temperature of from 40 to 60° C., the gelatin in one of said solutions being an acid-precursor gelatin having an alkaline isoionic pH and the gelatin in the other of said solutions being an alkali-precursor gelatin having an acidic isoionic pH, both of said gelatins being substantially salt-free, consecutively reducing the temperature of said mixture at intervals of about 10 to 20° C., and separating a gelatin coacervate fraction from the supernatant solution after each of said temperature intervals, at least two of said coacervate fractions being separated.

References Cited in the file of this patent

UNITED STATES PATENTS 2,743,265     Garono et al. _____ Apr. 24, 1956

OTHER REFERENCES

Stainsby: Chemical Abstracts (1955), vol. 49, pages 14430–14431.